Nov. 10, 1953  F. C. I. MARCHANT  2,658,334
BRAKING AIRCRAFT
Filed March 25, 1950

INVENTOR
F. C. I. MARCHANT
by Wilkinson Mawhinney
Attys.

Patented Nov. 10, 1953

2,658,334

UNITED STATES PATENT OFFICE 2,658,334

BRAKING AIRCRAFT

Francis Charles Ivor Marchant, Bristol, England, assignor to The Bristol Aeroplane Company Limited, Bristol, England, a British company Application March 25, 1950, Serial No. 151,909

9 Claims. (Cl. 60—35.54)

1

This invention concerns gas turbine engine installations for vehicles and relates more particularly to engines for propelling aeroplanes.

Due to the high landing speed of modern aeroplanes, such as jet-propelled aeroplanes, difficulty is experienced in landing on aerodromes as now generally available, and in using emergency landing grounds, since the wheel brakes of the undercarriage are insufficient to stop the run of the aeroplane in a requisite distance.

The object of the present invention is to enable aeroplanes having a high landing speed to use a specified landing space.

According to the present invention there is provided apparatus for producing a braking thrust on a vehicle which is driven by a gas turbine engine said apparatus comprising a combustion chamber, means for supplying fuel to the chamber, a duct adapted to convey air from the compressor of the gas turbine engine to said combustion chamber and a nozzle from which the combustion products are adapted to be discharged as a high velocity jet in a direction to produce said braking thrust.

According to a feature of the present invention there is provided in an aeroplane the combination of a gas turbine engine to propel the aeroplane and apparatus for producing a braking thrust on the aeroplane, said apparatus comprising a combustion chamber, means for supplying fuel to the chamber, a duct to convey air from the compressor of the gas turbine engine to said combustion chamber and a nozzle from which the combustion products are adapted to be discharged as a high-velocity jet in the same direction as the direction of flight of the aeroplane.

There may be provided for each gas turbine engine an associated braking-thrust producer. However, alternatively there may be a braking-thrust producer which is supplied with air from the compressor of each of two or more engines. In a further alternative two or more braking-thrust producers are supplied with compressed air from a single gas turbine engine.

Figure 1:
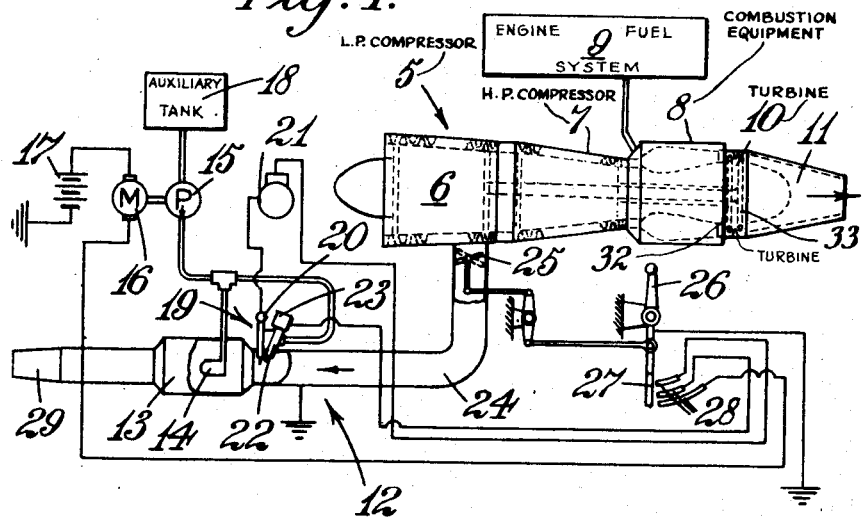
Figure 2:
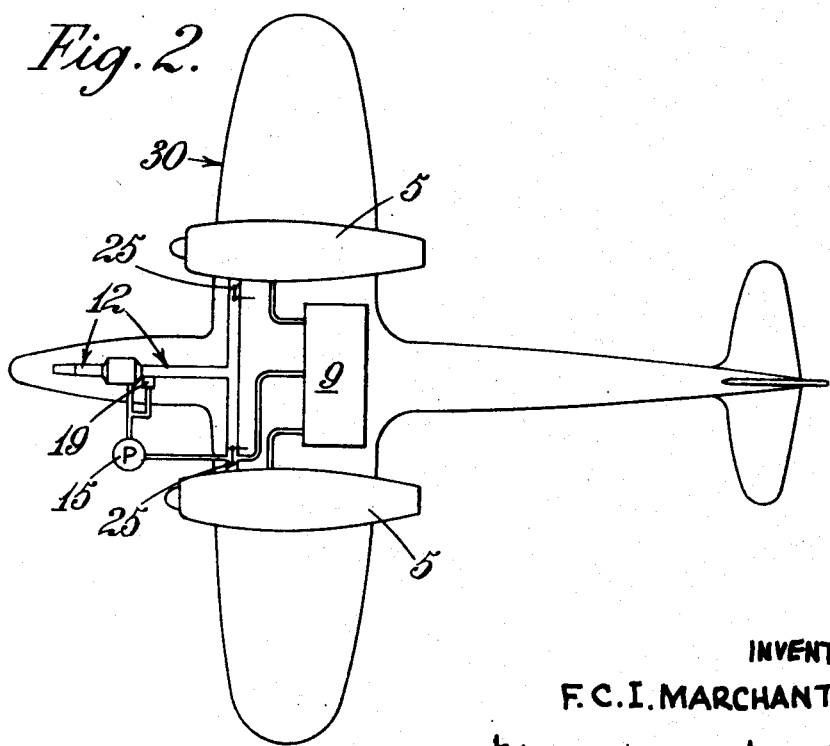

In order that the nature of the present invention may be better understood two practical embodiments thereof will now be described, by way of example only, with reference to the accompanying drawing whereof:

Figure 1 is a schematic arrangement of a gas turbine engine and a braking-thrust producer associated therewith in accordance with this invention, and Figure 2 diagrammatically shows the installation of a braking-thrust producer in accordance with the present invention installed in an aeroplane.

Referring to Figure 1: the gas turbine engine, which is generally indicated by reference numeral 5, is provided to propel an aeroplane by jet reaction. The engine 5 comprises a compressor assemblage having a low-pressure axial-flow compressor 6 which delivers to a high-pressure axial-flow compressor 7. The latter in turn delivers to the combustion equipment 8 of the engine which is supplied with fuel in any known or convenient manner from the engine fuel system which is generally indicated at 9. The products of combustion from the equipment 8 pass to a gas turbine, indicated at 10 and thence by a tail pipe 11 from which they are discharged as a rearwardly-directed jet.

The arrangement of engine 5 described is of conventional form and according to the present invention there is provided in combination with the engine a braking-thrust producer generally indicated by the reference numeral 12.

The braking-thrust producer 12 comprises a combustion chamber 13 having a fuel burner 14 which is supplied with fuel by pump 15 which is driven by electric motor 16. The motor 16 is shown in Figure 1 as being driven from a battery 17 but such an arrangement is given only for purposes of illustration. The pump 15 may be driven from the engine 5. The pump 15 draws fuel from an auxiliary tank 18 which is independent of the fuel system 9.

In order to ignite the fuel from burner 14 there is provided a fuel igniter of any convenient or known construction which is generally indicated at 19. The fuel igniter 19 may comprise an ignition plug 20 which is connected with a device 21 for producing a series of sparks in rapid succession at the plug. Associated with the plug 20 is a valve 22 which is spring closed and is opened when a solenoid 23 is energised. The valve 22 controls the passage of fuel from the pump 15 into a duct 24 which connects the combustion chamber 13 with the compressor 6.

Air is tapped from the compressor 6 by duct 24 at any convenient point, such as towards the delivery end of the compressor and the flow of air along the duct 24 is controlled by a valve 25 which is adjusted by a cockpit control 26. The latter may be a separate control or it may be one of the controls for the engine 5.

Adjustment of the control 26 moves a contact arm 27 into engagement with contacting strips 28 which are in the circuits of the motor 16, the device 21 and the solenoid 23.

With the arrangement described when the control 26 is adjusted in one direction the valve 25 is opened and at the same time the circuits to the motor 16, device 21 and solenoid 23 are completed so that fuel is delivered by the pump 15 to the burner 14 and through valve 22. Fuel passing through the valve 22 is ignited by the plug 20 and will light the fuel from the burner 14.

It will be noted that the contact strips 28 associated with the device 21 and solenoid 23 are shorter than the strip associated with the motor 16. This is provided to ensure that the fuel igniter is only used to start combustion in the chamber 13.

It is intended that the control 26 will be actuated to bring the braking-thrust producer 12 into operation immediately prior to the aeroplane touching down.

The products of combustion from chamber 13 pass to a jet nozzle 29 which points in the direction of flight of the aeroplane. The combustion products are therefore discharged from the nozzle 29 as a high-velocity jet in the same direction as the direction of flight of the aeroplane and a braking thrust is applied to the aeroplane which materially reduces its flight speed.

The only limitation on the temperature in the chamber 13 is the melting point of the materials from which it is made since there are no rotating parts and it is therefore considered that a braking thrust may be produced which is sufficient to effectively bring the aeroplane to rest in a relatively short distance.

The arrangement of Figure 1 is preferred in which for each engine 5 there is a braking-thrust producer 12 but it is to be understood that one such thrust producer may be associated with two or more engines. Such an arrangement is shown in Figure 2 in which a pair of engines 5 are provided to propel an aeroplane 30 by jet reaction and there is a braking-thrust producer 12 which is supplied with air from the compressor of either or both engines 5. The air from each engine to the apparatus 12 is controlled by a valve 25 and it is preferred that these valves be interconnected so that they are opened and closed together.

In the arrangement shown in Figure 2 the pump 15 supplies fuel to the apparatus 12 from the fuel system 9 of the engines 5.

In the gas turbine engine described with reference to the drawings it will be seen that the turbine 10 has a pair of independent rotors 32, 33 through which the combustion products pass in succession and each rotor is arranged to drive one of the compressors 6, 7 of the compressor assemblage so that the engine is provided with two independent rotary systems. An important advantage of this invention follows from the use of a braking-thrust producer with an engine having independent rotary systems where air for the thrust producer is tapped off the low-pressure compressor. When the thrust producer 12 is brought into operation during landing the air removed from compressor 6 results in a smaller mass flow through engine 5 and the jet thrust from the tail pipe is considerably reduced as a consequence—which is an advantage. By suitably controlling the rotary system incorporating compressor 7, under these conditions of smaller mass flow, the speed of said compressor may be increased to ensure satisfactory operation of the engine thereby further reducing the energy available in the jet discharged from the tail pipe.

I claim:

1. For propelling an aeroplane, a gas turbine engine comprising a compressor assemblage having a low-pressure air compressor and a high-pressure air compressor, combustion equipment to receive compressed air from said compressor assemblage means to supply fuel to said combustion equipment, and a pair of independently rotatable turbine rotors to receive in turn the hot products of combustion from the combustion equipment, each of said turbine rotors driving one of the air compressors, in combination with an apparatus for producing a braking thrust on the aeroplane said apparatus comprising a combustion chamber separate of the combustion equipment, means for supplying fuel to said chamber, a duct to convey compressed air from the compressor assemblage upstream of the high-pressure stage thereof to said combustion chamber, and a nozzle from which the combustion products are adapted to be discharged as a high velocity jet in a direction to produce said braking thrust.

2. For propelling an aeroplane, a plurality of gas turbine engines each comprising a compressor assemblage having a low-pressure air compressor and a high-pressure air compressor, combustion equipment to receive compressed air from said compressor assemblage, means to supply fuel to said combustion equipment, and a pair of independently rotatable turbine rotors to receive in turn the hot products of combustion from the combustion equipment, each of said turbine rotors driving one of the air compressors, in combination with apparatus for producing a braking thrust on the aeroplane said apparatus comprising for each gas turbine engine, a combustion chamber separate of said combustion equipment, means for supplying fuel to said chamber, a duct to convey air to said combustion chamber from the compressor assemblage of the associated engine upstream of the high-pressure stage of the assemblage, and a nozzle from which the combustion products are adapted to be discharged as a high velocity jet in a direction to produce said braking thrust.

3. For propelling an aeroplane, a plurality of gas turbine engines each comprising a compressor assemblage having a low-pressure air compressor and a high-pressure air compressor, combustion equipment to receive compressed air from said compressor assemblage, means to supply fuel to said combustion equipment, and a pair of independently rotatable turbine rotors to receive in turn the hot products of combustion from the combustion equipment, each of said turbine rotors driving one of the air compressors, in combination with apparatus for producing a braking thrust on the aeroplane said apparatus comprising a combustion chamber separate of said combustion equipment, means for supplying fuel to said chamber, a duct to convey air to said combustion chamber from the compressor assemblage upstream of the high pressure stage thereof of at least two of said gas turbine engines, and a nozzle from which the combustion products are adapted to be discharged as a high velocity jet in a direction to produce said braking thrust.

4. For propelling an aeroplane, a gas turbine engine comprising a compressor assemblage having a low-pressure air compressor and a high-pressure air compressor, combustion equipment to receive compressed air from said compressor assemblage, means to supply fuel to said combustion equipment, and a pair of independently rotatable turbine rotors to receive in turn the hot products of combustion from the combustion equipment, each of said turbine rotors driving one of the air compressors, in combination with apparatus for producing a braking thrust on the aeroplane said apparatus comprising at least two combustion chambers separate of said combustion equipment, means for supplying fuel to each of said chambers, ducts to convey air to said combustion chambers from the compressor assemblage upstream of the high pressure stage thereof and, for each of said combustion chambers a nozzle from which the combustion products are adapted to be discharged as a high velocity jet in a direction to produce said braking thrust.

5. For propelling an aeroplane, a gas turbine engine comprising a compressor and assemblage having a low-pressure air compressor and a hig-pressure air compressor, combustion equipment to receive compressed air from said compressor assemblage means to supply fuel to said combustion equipment and a pair of independently rotatable turbine rotors to receive in turn the hot products of combustion from the combustion equipment, each of said turbine rotors driving one of the air compressors, in combination with an apparatus for producing a braking thrust on the aeroplane said apparatus comprising a combustion chamber separate of the combustion equipment, means for supplying fuel to said chamber, a duct to convey compressed air from the compressor assemblage upstream of the high-pressure stage thereof to said combustion chamber, a valve in said duct to control the supply of air to said combustion chamber, a fuel igniter in said combustion chamber, a common control means for said valve, fuel igniter and fuel supply means to the combustion chamber, such that when said common control means is actuated the valve is opened, fuel is supplied to the chamber and the igniter is lit, and a nozzle from which the combustion products are adapted to be discharged as a high velocity jet in a direction to produce said braking thrust.

6. The combination of a gas turbine engine for propelling an aeroplane and an apparatus for producing a braking thrust on the aeroplane as claimed in claim 5, wherein the fuel supply means comprises a pump to deliver fuel to the separate combustion chamber from a fuel tank, fuel from said tank being delivered to the combustion equipment of the gas turbine engine by further separate supply means.

7. The combination of a gas turbine engine for propelling an aeroplane and an apparatus for producing a braking thrust on the areoplane as claimed in claim 5, wherein the fuel supply means for the separate combustion chamber supplies fuel from a fuel tank which is independent of the fuel system of the gas turbine engine.

8. For propelling an aeroplane, a plurality of gas turbine engines each comprising a compressor assemblage having a low-pressure air compressor and a high-pressure air compressor, combustion equipment to receive compressed air from said compressor assemblage, means to supply fuel to said combustion equipment, and a pair of independently rotatable turbine rotors to receive in turn the hot products of combustion from the combustion equipment, each of said turbine rotors driving one of the air compressors, in combination with apparatus for producing a braking thrust on the aeroplane said apparatus comprising a combustion chamber separate of said combustion equipment, means for supplying fuel to said chamber, a duct to convey air to said combustion chamber from the compressor assemblage upstream of the high pressure stage thereof of at least two of said gas turbine engines, an air control valve in each of said ducts, common control means to open and close said valves together, and a nozzle from which the combustion products are adapted to be discharged as a high velocity jet in a direction to produce said braking thrust.

9. For propelling an aeroplane, a gas turbine engine comprising a compressor assemblage having a low-pressure air compressor and a high-pressure air compressor, combustion equipment to receive compressed air from said compressor assemblage, means to supply fuel to said combustion equipment, and a pair of independently rotatable turbine rotors to receive in turn the hot products of combustion from the combustion equipment, each of said turbine rotors driving one of the air compressors, in combination with an apparatus for producing a braking thrust on the aeroplane said apparatus comprising at least two combustion chambers separate of said combustion equipment, means for supplying fuel to each of said chambers, ducts to convey air to said combustion chambers from the compressor assemblage upstream of the high pressure stage thereof, an air-control valve in each of said ducts, independent means to open and close said valves, and for each of said combustion chambers, a nozzle from which the combustion products are adapted to be discharged as a high velocity jet in a direction to produce said braking thrust.

FRANCIS CHARLES IVOR MARCHANT.

References Cited in the file of this patent

UNITED STATES PATENTS

| Number | Name | Date |
|---|---|---|
| 2,280,835 | Lysholm | Apr. 28, 1942 |
| 2,396,911 | Anxionnaz et al. | Mar. 19, 1946 |
| 2,527,732 | Imbert | Oct. 31, 1950 |

FOREIGN PATENTS

| Number | Country | Date |
|---|---|---|
| 586,572 | Great Britain | Mar. 24, 1947 |